US011899421B2

(12) United States Patent
Allenberg-Rabe et al.

(10) Patent No.: US 11,899,421 B2
(45) Date of Patent: Feb. 13, 2024

(54) CALIBRATING A SCANNER DEVICE

(71) Applicant: TRUMPF Laser-und Systemtechnik GmbH, Ditzingen (DE)

(72) Inventors: Matthias Allenberg-Rabe, Stuttgart (DE); Jürgen Ortmann, Attendorn (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 500 days.

(21) Appl. No.: 16/408,557

(22) Filed: May 10, 2019

(65) Prior Publication Data
US 2019/0270161 A1 Sep. 5, 2019

Related U.S. Application Data

(63) Continuation of application No. PCT/EP2017/078140, filed on Nov. 3, 2017.

(30) Foreign Application Priority Data

Nov. 11, 2016 (DE) .......................... 102016222186.8

(51) Int. Cl.
*G05B 19/401* (2006.01)
*B33Y 10/00* (2015.01)
(Continued)

(52) U.S. Cl.
CPC ............ *G05B 19/401* (2013.01); *B22F 10/31* (2021.01); *B22F 12/49* (2021.01); *B23K 26/082* (2015.10);
(Continued)

(58) Field of Classification Search
CPC .. B23K 26/082; B23K 26/342; B23K 26/354; B23K 26/34; B23K 26/034;
(Continued)

(56) References Cited

U.S. PATENT DOCUMENTS 5,085,509 A 2/1992 Gaffard et al.
5,123,024 A 6/1992 Dowd et al.
(Continued)

FOREIGN PATENT DOCUMENTS

CN 1333713 1/2002
CN 102132378 7/2011
(Continued)

OTHER PUBLICATIONS

EP Office Action by European Appln. No. 17803812.1, dated Mar. 22, 2021, 12 pages (with English translation).
(Continued)

*Primary Examiner* — Janie M Loeppke
*Assistant Examiner* — Simpson A Chen
(74) *Attorney, Agent, or Firm* — Fish & Richardson P.C.

(57) ABSTRACT

The present disclosure relates to calibrating scanner devices for positioning laser beams in a processing field, and includes, e.g.: arranging a retroreflector in the processing field of the scanner device, the processing field being formed in a processing chamber for irradiating powder layers; detecting laser radiation reflected back into the scanner device when the laser beam passes over the retroreflector; determining an actual position of the laser beam in the processing field using the detected laser radiation; and calibrating the scanner device by correcting a laser beam target position specified for the scanner device in the processing field using the determined actual position of the laser beam in the processing field.

17 Claims, 1 Drawing Sheet

(51) Int. Cl.
| | |
|---|---|
| B33Y 30/00 | (2015.01) |
| B33Y 50/02 | (2015.01) |
| B23K 26/082 | (2014.01) |
| B23K 26/354 | (2014.01) |
| B23K 26/34 | (2014.01) |
| B23K 26/342 | (2014.01) |
| G02B 26/10 | (2006.01) |
| B29C 64/268 | (2017.01) |
| B29C 64/153 | (2017.01) |
| B22F 10/31 | (2021.01) |
| B22F 12/49 | (2021.01) |
| G01S 5/16 | (2006.01) |
| G02B 5/122 | (2006.01) |
| G02B 27/62 | (2006.01) |
| G02B 7/00 | (2021.01) |
| B22F 10/28 | (2021.01) |
| B22F 12/41 | (2021.01) |
| B22F 12/44 | (2021.01) |

(52) U.S. Cl.
CPC ............ *B23K 26/34* (2013.01); *B23K 26/342* (2015.10); *B23K 26/354* (2015.10); *B29C 64/153* (2017.08); *B29C 64/268* (2017.08); *B33Y 10/00* (2014.12); *B33Y 30/00* (2014.12); *B33Y 50/02* (2014.12); *G02B 26/101* (2013.01); *B22F 10/28* (2021.01); *B22F 12/41* (2021.01); *B22F 12/44* (2021.01); *B22F 2998/10* (2013.01); *B22F 2999/00* (2013.01); *G01S 5/16* (2013.01); *G02B 5/122* (2013.01); *G02B 7/003* (2013.01); *G02B 27/62* (2013.01); *G05B 2219/49018* (2013.01); *Y02P 10/25* (2015.11)

(58) Field of Classification Search
CPC  B23K 26/032; B23K 26/127; B23K 26/0608; B23K 26/702; B23K 26/0613; B23K 26/0006; B23K 26/705; B33Y 10/00; B33Y 30/00; B33Y 50/02; B33Y 40/00; B29C 64/153; B29C 64/268; B29C 64/393; B29C 64/277; B29C 64/295; B29C 64/255; B29C 64/264; B29C 64/20; B22F 10/20; B22F 10/30; B22F 2998/10; B22F 2999/00; B22F 12/00; B22F 10/00; B22F 10/28; G02B 26/101; G02B 5/122; G02B 7/003; G02B 27/62; G05B 19/401; G05B 2219/49018; G05B 19/4015; G05B 19/4099; Y02P 10/25; G01S 5/16; G01J 5/20; G01J 5/004; G01J 5/602; B28B 17/0081; B28B 1/001

USPC ..................................................... 219/121.6
See application file for complete search history.

(56) References Cited

U.S. PATENT DOCUMENTS

| | | | |
|---|---|---|---|
| 5,753,171 A | 5/1998 | Serbin et al. | |
| 6,594,006 B1 | 7/2003 | Muehlhoff et al. | |
| 6,615,099 B1 | 9/2003 | Polgar et al. | |
| 8,258,426 B2 | 9/2012 | Zhang et al. | |
| 8,807,766 B2 | 8/2014 | Hung et al. | |
| 10,850,326 B2 | 12/2020 | Ashton et al. | |
| 2003/0002055 A1 | 1/2003 | Kilthau et al. | |
| 2005/0281102 A1* | 12/2005 | Bruland | B23K 26/082 257/E23.15 |
| 2009/0002687 A1 | 1/2009 | Wenzel | |
| 2010/0176539 A1 | 7/2010 | Higashi et al. | |
| 2010/0292947 A1 | 11/2010 | Buk | |
| 2013/0186871 A1 | 7/2013 | Suzuki et al. | |
| 2015/0346330 A1* | 12/2015 | Markendorf | G01S 7/4972 356/4.07 |
| 2016/0082668 A1 | 3/2016 | Perret et al. | |
| 2016/0144571 A1* | 5/2016 | Philippi | B29C 64/393 250/206 |
| 2016/0228987 A1 | 8/2016 | Baudimont et al. | |
| 2016/0236279 A1* | 8/2016 | Ashton | B22F 12/49 |
| 2016/0303806 A1* | 10/2016 | Mercelis | G03F 7/0037 |
| 2018/0126647 A1 | 5/2018 | Schultheiss | |
| 2018/0354034 A1* | 12/2018 | Vaes | B22F 10/28 |

FOREIGN PATENT DOCUMENTS

| | | | | |
|---|---|---|---|---|
| CN | 103149509 | | 6/2013 | |
| CN | 103676420 | | 3/2014 | |
| CN | 105745060 | | 7/2016 | |
| DE | 19923821 | | 11/2000 | |
| DE | 112008002862 | | 12/2010 | |
| DE | 102010060958 | A1 | 6/2012 | |
| DE | 102012100721 | | 4/2013 | |
| DE | 102012110646 | | 5/2014 | |
| DE | 102012110646 | A1 * | 5/2014 | ........... G02B 26/101 |
| DE | 102015103389 | | 9/2016 | |
| EP | 0 331 962 | | 9/1989 | |
| WO | WO 2009/026520 | | 2/2009 | |
| WO | WO 2015/040185 | | 3/2015 | |
| WO | WO 2016/085334 | | 6/2016 | |
| WO | WO-2016085334 | A2 * | 6/2016 | .............. B22F 10/00 |

OTHER PUBLICATIONS

German Office Action for German Application No. DE 10 2016 222 186.8 dated Sep. 29, 2017.
International Search Report and Written Opinion for International Application No. PCT/EP2017/078140 dated Feb. 23, 2018.
CN Office Action in Chinese Appln. No. 201780070021.2, dated Dec. 15, 2020, 12 pages (English translation).
CN Office Action in Chinese Appln. No. 201780070021.2, dated Aug. 12, 2021, 24 pages (with English translation).
CN Decision to Grant in Chinese Appln. No. 201780070021.2, dated Nov. 24, 2021, 8 pages (with English translation).
CN Office Action in Chinese Appln. No. 202210110816.4, dated Jun. 30, 2023, 20 pages (with English translation).

* cited by examiner

CALIBRATING A SCANNER DEVICE

CROSS REFERENCE TO RELATED APPLICATIONS

This application is a continuation of and claims priority under 35 U.S.C. § 120 from PCT Application No. PCT/EP2017/078140, filed on Nov. 3, 2017, which claims priority from German Application No. 10 2016 222 186.8, filed on Nov. 11, 2016. The entire contents of each of these priority applications are incorporated herein by reference.

TECHNICAL FIELD

The present disclosure relates to calibrating a scanner device for positioning a laser beam in a processing field. The present disclosure also relates to machining devices for producing three-dimensional components by irradiating powder layers.

BACKGROUND

A scanner device for directing or positioning a laser beam on a processing field typically has at least one, generally two, deflectable and rotatable scanner mirrors. In a scanner device of this kind, the design typically results in a pincushion image distortion in the processing field of the scanner device (hereinafter also referred to as the image field). The transmission factor between the rotational movement of the scanner mirror and the movement of the position of the laser beam in the image field is also dependent on the distance between the scanner device and the image field. Therefore, using a scanner device of this kind a predetermined pattern is typically projected onto an image field with certain geometric errors. For a predetermined pattern to be projected to scale and in a distortion-free manner by means of a scanner device of this kind, calibration is used. During calibration, the projection errors of the scanner device are determined as precisely as possible and the actuation of the scanner device is suitably modified on the basis of the determined projection errors such that the projection errors and the modified actuation of the scanner device specifically compensate for one another and the desired pattern is produced in the image field.

US 2013/0186871 A1 discloses a laser machining device for irradiating a workpiece using a laser beam, wherein a holder is provided, on the surface of which a workpiece can be arranged during the laser processing. A grid is attached to the surface of the holder and marks the positional coordinates of each position on the surface of the holder. The laser beam is positioned on the surface at a target irradiation position by means of a mirror, and an image of the target irradiation position and of its surrounding region on the surface is captured by the camera sensor. On the basis of the image taken by the camera sensor, an error between the target irradiation position and an actual position of the laser beam is detected. The grid serves as a reference for the XY coordinates on the surface of the holder, and thus is used to identify the errors between the respective actual positions and target irradiation positions.

In WO 2009/026520 A1, an automatic geometric calibration is carried out by means of a calibration plate, which has a non-scattering surface having a plurality of scattering measurement markers in a periodic grid. A laser beam is scanned over the measurement markers and the scattered radiation is detected by a detector arranged above the calibration plate. The detected signals are processed in order to measure the actual center position of the measurement markers and carry out interpolation so as to thus establish a calibrated relationship between the angular positions of scanner mirrors and XY positions in a construction plane.

US 2003/0002055 A1 describes a method for calibrating the optical system of a laser machine, wherein a sample plate is arranged in the focal plane of an imaging unit and predetermined grid points are marked by a laser beam. The marked points are measured by means of a camera and their position values are compared with predetermined position values of target points so as to derive correction values therefrom and store them, said values being used to actuate a deflection unit.

WO 2015/040185 A1 describes a method for calibrating a laser scanner system, wherein a calibration plate having reference markings is used, said plate being arranged so as to record one directional beam within a set of known laser scanner positions. The directional beam generates a laser spot on the calibration plate and the laser spot is recorded using an image recording device, for example a digital camera. The calibration plate may be made of a partially reflective material, for example anodized aluminum, that is not so reflective that the laser beam fully floods the image taken by the image recording device.

SUMMARY

In general, in some aspects, the subject matter of the present disclosure can be embodied in methods for calibrating scanner devices as well as embodied in machining devices that allow a laser beam to be very accurately positioned in a processing field. In some aspects, the methods include: arranging at least one retroreflector in the processing field of the scanner device, said field being formed in a processing chamber for irradiating powder layers by the laser beam; detecting laser radiation that is reflected back into the scanner device as the laser beam passes over the retroreflector; determining an actual position of the laser beam on the basis of the detected laser radiation; and calibrating the scanner device by correcting a target position of the laser beam specified for the scanner device in the processing field on the basis of the determined actual position of the laser beam in the processing field.

Implementations of the methods may include one or more of the following features. For example, in some implementations, a retroreflector is used to calibrate the scanner device, e.g., the retroreflector may include a reflective material or reflective object that reflects a significant proportion of a laser beam impinging on the retroreflector, substantially independently of the angle of incidence with respect to the beam source (in this case the scanner device). The retroreflector has a reflectance of, e.g., more than 5% in the direction of incidence of the laser beam over a wide incidence angle range. The reflectance of the retroreflector in the direction of incidence is thus considerably higher than in conventional reflective objects or materials, in which the incident radiation is reflected in a specular manner such that only a very small proportion of scattered laser radiation is reflected back in the direction of incidence of the laser beam. The higher intensity of the laser radiation reflected back to the scanner device by the retroreflector increases the detectability of said radiation and thus increases the precision with which the actual position of the laser beam in the processing field can be determined.

In a scanner device used in a machining device for producing three-dimensional components, the processing field of the scanner device is located in a processing chamber, in which a powder material is arranged. Typically, a focusing device focuses the laser beam in the plane in which a powder layer is arranged, which is irradiated by means of the laser beam so as to produce a layer of the three-dimensional component, for which purpose the powder material is locally fused. For the calibration, the retroreflector can be manually introduced into the processing chamber and arranged in the processing field.

In some implementations, the retroreflector is arranged in the processing field of the scanner device in an automated manner (i.e., in a manner in which a user does not direct movement of the retroreflector). For this purpose, the retroreflector can be attached to a movable device that is moved into the processing field to carry out the calibration and then removed from the processing field again to carry out the irradiation to produce the three-dimensional component. For the movement to be automated, a pivotable and/or slidable arm can be used, for example, which moves the retroreflector into and out of the processing field.

In some implementations, the retroreflector is moved on a movable device for depositing powder layers in the processing field of the scanner device. In the processing chamber, there is typically a device that deposits a thin powder layer either on powder layers therebelow or on a support for the powder layers. The device is moved at least in part in the processing field of the scanner device so as to deposit each powder layer, for example in a linear movement. By way of example, the device may be an arm having a slider or roller which transports the powder material from a reservoir to the support or to a powder bed located above the support. In particular, the device for depositing the powder layers can comprise a plurality of retroreflectors in the form of three-dimensional objects. By way of example, these can be arranged at a spacing from one another in a direction perpendicular to the movement direction for transporting the powder material so as to allow the scanner device to be calibrated at a plurality of positions in this direction.

In this way, the device for depositing powder layers, which is present in the machining device in any case, can also be used to arrange the retroreflector in the processing field. In general, the retroreflector is arranged in a stationary manner in the processing field when it is passed over by the laser beam, e.g., the movement of the device for depositing the powder layers is stopped during the calibration or when the laser beam is passing over. However, this is not strictly necessary, e.g., the retroreflector can optionally be moved over the processing field even during the calibration, more specifically while the actual position of the laser beam is being determined.

In some implementations, the laser beam is reflected back into the scanner device on a retroreflector in the form of a three-dimensional object, in particular in the form of a ball that is transparent to a wavelength of the incident processing or pilot laser light used during operation of the system, the actual position of the laser beam in the processing field preferably being determined on the basis of an intensity distribution of the reflected laser radiation detected. A three-dimensional object should be understood as being an object that has an extension in all three dimensions in space of at least 20 μm, preferably of at least 50 μm, particularly preferably of at least 100 μm, in particular of at least 1 mm.

In this implementation, the retroreflector can, for example, be a (small) transparent ball that may be made of a material that transmits the laser beam, e.g., glass, in particular quartz glass, sapphire, diamond, among others, and generally has a diameter in the order of several micrometers up to a few millimeters, generally of less than 10 mm.

A three-dimensional retroreflector of this kind allows the scanner device to be very precisely calibrated to a particular position corresponding to the retroreflector position in the processing field, the retroreflector position being predetermined by the position, more specifically by the XY coordinates, of the center of the transparent ball. The transparent ball acts as a retroreflector since it focuses a large part of the incident light from a remote light source onto a spot in the region of the rear surface of the ball, the rear surface of the ball acting as a retroreflector due to the difference in the refractive indices between the ball and the surrounding region, typically air. It goes without saying that three-dimensional objects formed in a different manner, e.g. as prisms or the like, can optionally also be used as retroreflectors. For the precise calibration to a plurality of positions in the image field, it is also possible to use a plurality of three-dimensional retroreflectors arranged on a common support at a spacing from one another.

By way of example, the calibration can be carried out as follows: the retroreflector in the form of the three-dimensional object is arranged at a specified reflector position in the processing field, and a target position that notionally corresponds to the predetermined reflector position in the processing field is specified for the scanner device. If the actual position of the laser beam in the processing field corresponds exactly to the specified target position, the laser beam is maximally reflected on the retroreflector, e.g., a maximum intensity of the reflected laser radiation is detected. In the event of deviations between the actual position and the target position, a lower intensity of the reflected laser radiation is detected. To determine the actual position of the laser beam that corresponds to the reflector position, the scanner device passes over the retroreflector multiple times, during which the scanner device scans a region that has a predetermined spatial extension around the notional reflector position and the laser radiation reflected in each case is detected. Using image analysis, an intensity centroid is identified as the actual position from the two-dimensional intensity distribution (e.g., bitmap image) of the detected laser radiation. The actual position of the laser beam determined in this manner corresponds exactly to the reflector position. However, there is generally a deviation between the actual position and a target position specified for the scanner device (originally). This deviation is corrected in that, for example, the angular configurations present in the scanner device on the two scanner mirrors when the reflector position is reached are assigned to the actual position or reflector position as a new target position and stored in a memory device. If, during the subsequent processing, the scanner device positions the laser beam at a position in the processing field that corresponds to the reflector position, the corrected target position is specified for the scanner device.

In an alternative implementation, the laser beam is reflected back into the scanner device on a retroreflector in the form of a retroreflective surface region. In this case, a "retroreflector foil", in which a plurality of reflective elements, e.g., in the form of (micro) glass balls or glass beads or microprisms are embedded or encapsulated in the foil, can be used as a retroreflector, for example. In this case, the entire surface region acts as a retroreflector such that the retroreflective element that reflects the laser radiation back into the scanner device is not or cannot be distinguished.

In a development, at least one non-retroreflective, for example, a light absorbent and/or light scattering, surface region, or a reflective (but not retroreflective) surface region, adjoins the retroreflective surface region. In this case, it is possible, for example, to use a plate-like calibration element, the surface of which is divided into retroreflective and non-retroreflective surface regions that greatly differ from the retroreflective surface regions on account of their scattering or reflective properties. The position of the retroreflective surface regions and of the non-retroreflective surface regions on the calibration element is known exactly on the basis of a prior measurement of the calibration element using a suitable measurement technique.

By way of example, the calibration element can be in the form of a retroreflective foil, on the surface of which a highly precise mask is applied, where the mask may have multiple non-retroreflective, e.g., scattering, absorbent or reflective, surface regions. The geometry of the highly precise mask is measured before the scanner device calibration, for example, using a coordinate measurement machine. The non-retroreflective surface regions forming the mask can be arranged in the manner of a checkerboard pattern, for example. Although it is also possible for the non-retroreflective surface regions to form a different regular pattern, e.g., a grid, or an irregular pattern, such as in the form of an irregular dot pattern. By way of example, the calibration element can be positioned in the processing chamber on a support on which the powder layers are deposited. To arrange the calibration element in the processing field of the scanner device, the above-described device for depositing powder layers can likewise be used.

In a development, the actual position of the laser beam in the processing field is determined on the basis of a difference in the intensity of the detected laser radiation at a transition between the retroreflective surface region and the non-retroreflective surface region. In the processing field, the laser beam can be moved along a movement path in which the laser beam scans across at least one transition between a retroreflective surface region and a non-retroreflective surface region. The laser radiation reflected or scattered back into the scanner device is detected, and the actual position of the laser beam on the calibration device, and thus also in the processing field, can be determined on the basis of a generally very significant difference in the detected intensity at the border between the retroreflective surface region and the non-retroreflective surface region, since the positions of the non-retroreflective portions or of the mask have been precisely measured on the calibration element and are thus known. The actual position of the laser beam is then compared with a target position specified for the scanner device in order to correct any deviations arising between the actual position and the target position, for which purpose the target position specified for the controller of the scanner device is suitably adapted. The calibration can be carried out for a plurality of positions in the processing field that are formed at the border between a retroreflective portion and a non-retroreflective portion, provided that a target path at which the laser beam crosses a plurality of such borders has been specified for the scanner device for the calibration. As a result of the comparison between the specified target positions and the actual positions of the laser beam at each border, the projection errors of the scanner device at a plurality of positions in the processing field can be determined and corrected or compensated for as necessary.

In some implementations, a pilot laser beam is used to calibrate the scanner device. The pilot laser beam used for the calibration typically has a lower power than the processing laser beam used to irradiate the powder layers. This may be advantageous to prevent damage to the retroreflector caused by the laser beam. For the laser source, it is also possible, for example, to use a fiber laser, the fibers of which are also used to transmit the pilot laser beam of the fiber laser, said pilot laser beam having a lower power than the processing laser beam and being positioned in the processing field by means of the scanner device. The wavelength of the pilot laser beam can also differ from the wavelength of the processing laser beam. Alternatively, the calibration may optionally also be carried out using the processing laser beam used to irradiate or fuse the powder layers.

In some implementations, at least one additional scanner device for directing an additional laser beam at an additional processing field formed in the processing chamber is calibrated as follows: detecting additional laser radiation that is reflected back into the additional scanner device as the additional laser beam passes over the retroreflector; determining an actual position of the additional laser beam in the additional processing field on the basis of the additional laser radiation detected; and calibrating the additional scanner device by correcting a target position, which has been specified for the additional scanner device, on the basis of the determined actual position of the additional laser beam in the additional processing field.

In machining devices for producing three-dimensional components, two or more irradiation devices having corresponding scanner devices may be used, with said devices being able to be operated simultaneously and actuated independently of one another so as to speed up the production of three-dimensional components. As a result of the powder material being fused, the support on which the powder layers are deposited heats up, and the build cylinder surrounding the powder layers typically also heats up significantly, resulting in the rest of the processing chamber also heating up and possibly deforming, especially if the processing chamber is provided with additional heating. Consequently, the calibration of the two scanner devices relative to one another may drift. By using one and the same retroreflector or one and the same calibration element to calibrate the two scanner devices, the two scanner devices can be calibrated relative to one another. The additional processing field of the additional scanner device can adjoin the processing field of the scanner device, have an overlap region with the processing field of the scanner device, or substantially coincide with the processing field of the scanner device.

In some implementations, the actual position of the laser beam and the actual position of the additional laser beam are determined simultaneously. On the retroreflector, each laser beam is reflected directly back to the specific scanner device of the two scanner devices from which it originated, and so the laser radiation and the additional laser radiation can be detected by two different detectors, e.g., in the form of photodiodes. In this way, the two scanner devices can be calibrated simultaneously, without this leading to undesirable distortion of the measurement results due to the other reflected laser radiation.

In general, in some aspects, the subject matter of the present disclosure relates to machining devices comprising: an irradiation device having a scanner device for positioning a laser beam in a processing field; a processing chamber in which the processing field is formed and which has a support for applying the powder layers; at least one retroreflector arranged in the processing field of the scanner device; a detector for detecting laser radiation reflected back into the scanner device by the retroreflector as the laser beam passes over the retroreflector; an evaluation device in the form of a measurement computer for determining an actual position of the laser beam in the processing field on the basis of the detected laser radiation; and a controller for specifying a target position of the laser beam in the processing field, in which the controller is configured to correct the specified target position on the basis of the determined actual position.

The machining device may be used to locally fuse a powder bed or powder layer typically arranged in the processing field of the scanner device so as to generate a layer of the three-dimensional component by laser metal fusion (LMF). In addition to the scanner device, the irradiation device may also have a focusing device, which is used to focus the laser beam in the processing field. The focusing device can be configured adaptively so as to change the distance between the scanner device and the processing field. The irradiation device additionally has a laser beam, for example, in the form of a fiber laser.

In some implementations, the machining device includes a movement device for moving the at least one retroreflector into (and out of) the processing field of the scanner device. The movement device allows the retroreflector or calibration device to be introduced into the processing field of the scanner device in an automated manner. In this way, the scanner device can be calibrated, where necessary, while a three-dimensional component is being produced, for which purpose the processing may be briefly interrupted. This is particularly advantageous in the event that the processing chamber as a whole is deformed or warped due to significant heating, in which case the scanner device may be calibrated before a three-dimensional component is fully completed.

In some implementations, the movement device for moving the at least one retroreflector into the processing field of the scanner device is configured as a device for depositing powder layers. For example, the device may be an arm to which a slider is attached for conveying the powder material to the support and distributing it on the surface thereof or on the powder bed.

In some implementations, the retroreflector is formed as a three-dimensional object, e.g., as a ball that is transparent to a wavelength of the incident processing or pilot laser light used during operation of the system, or as a retroreflective surface region. In the case the retroreflector is a transparent ball, the retroreflector may be a small ball having a diameter typically in the range of several micrometers to a few millimeters. In the second case, the retroreflector may, for example, be a retroreflector foil in which microscopic balls, prisms, among others are embedded or encapsulated. A mask can be applied to the retroreflector foil and forms a pattern of surface regions that have no retroreflective properties.

The detector may be arranged coaxially with the beam path of the laser beam in the irradiation direction, the laser radiation reflected back to the scanner device being coupled out of the beam path of the laser beam for example by a beam splitter such as, for example, a partially transmissive deflection mirror. By way of example, the beam splitter can have a highly reflective dielectric coating at which only a small proportion of the intensity of the laser radiation is transmitted to the detector. The reflected laser radiation may be focused or imaged onto the detector by an imaging device, e.g., by a lens.

In some implementations, the detector is configured as a diode, e.g., the detector is not a position-sensitive detector. In the present case, detecting the intensity of the laser radiation by means of a non-position-sensitive detector is sufficient since the position of the laser beam in the processing field can be varied by means of the scanner device. A detector in the form of a diode may already be present for monitoring the process for producing the three-dimensional component in the processing machine, and so the detector advantageously also can be used to calibrate the scanner device.

In some implementations, the machining device additionally includes: an additional scanner device for positioning an additional laser beam in an additional processing field; an additional detector for detecting additional laser radiation reflected back into the scanner device by the retroreflector as the additional laser beam passes over the retroreflector; an additional evaluation device in the form of a measurement computer for determining an actual position of the additional laser beam in the additional processing field on the basis of the additional laser radiation detected; and an additional controller for specifying a target position of the additional laser beam in the additional processing field, in which the additional controller is configured to correct the specified target position on the basis of the determined actual position. As described herein, by using a machining device of this kind having two or more scanner devices, it is possible to simultaneously calibrate two or more scanner devices by one and the same retroreflector.

In the machining devices described herein, the process monitoring detector that may already be present and/or the powder layer depositing device that is already present also may be used for the calibration, and so no additional measurement instruments apart from the retroreflector are required to carry out the calibration. In addition, the calibration may optionally be fully automated such as to prevent operator errors in the calibration and dramatically reduce the time required for the calibration.

Further advantages of the invention will become apparent from the description and the drawings. The aforementioned features and those yet to be stated can likewise each be used either in isolation or together in any combinations. The embodiments shown and described should not be taken to be an exhaustive list, but rather are intended as examples for outlining the invention.

DETAILED DESCRIPTION

Figure 1:
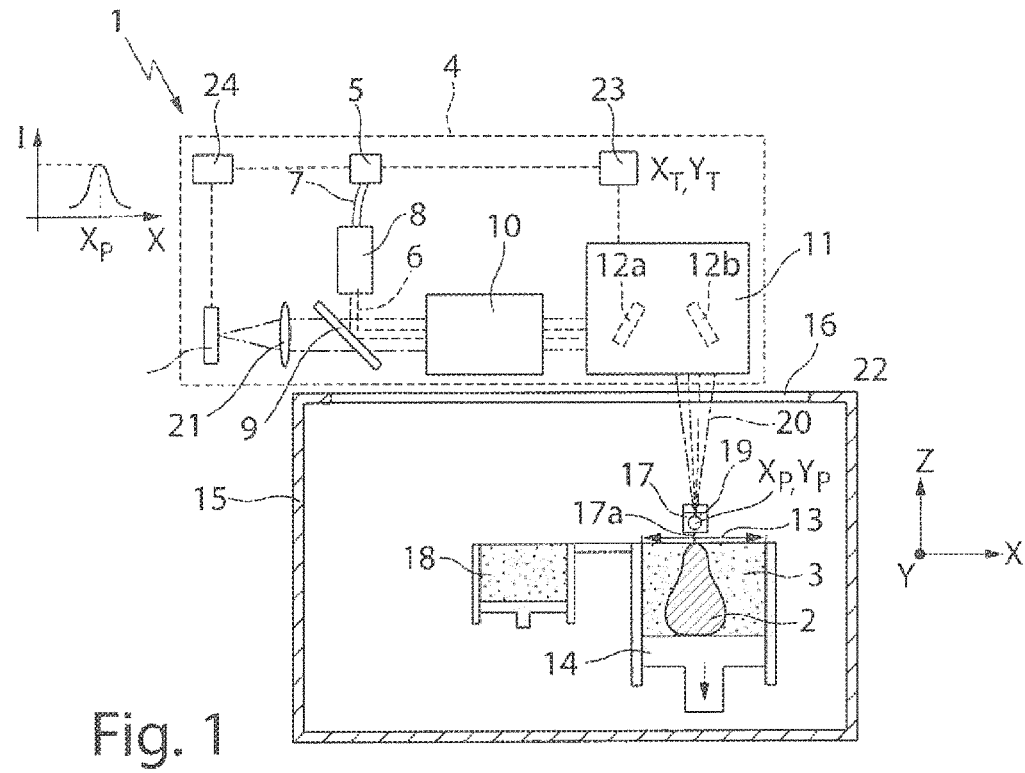
FIG. 1 is a schematic view of an exemplary machining device for producing three-dimensional components in which the machining device includes a retroreflector for calibrating a scanner device.

FIG. 1 is a schematic view of an exemplary construction of a machining device 1 for producing a three-dimensional component 2 by irradiating powder layers 3. In the example shown in FIG. 1, the powder layers 3 are positioned one on top of the other and form a powder bed in which the three-dimensional component 2 is embedded. The machining device 1 has an irradiation device 4, which has a laser source 5 in the form of a fiber laser for generating a laser beam 6, which is guided to a deflection mirror 9 through a fiber optic cable 7 and a collimation device 8. In the example shown, the laser beam 6 is a pilot laser beam used for the calibration (see below). To irradiate or locally fuse the powder layers 3, a higher-power processing laser beam is used, which is also generated by the laser source 5 in the form of a fiber laser. In the example shown, the pilot laser beam 6 has a wavelength that differs from the wavelength of the processing laser beam. In the example shown in FIG. 1, the deflection mirror 9 has a dielectric coating having a reflectance of more than approximately 99.9% for the wavelength of the processing laser beam, and a reflectance of approximately 30% to 80% for the wavelength of the pilot laser beam 6, and so a predominant proportion of the intensity of the pilot laser beam 6 is deflected towards a focusing device 10 at the deflection mirror 9.

Downstream of the focusing device 10, the laser beam 6 passes through a scanner device 11 having two scanner mirrors 12a, 12b in the form of galvanometer mirrors. The scanner device 11 is used to position the laser beam 6 in a processing field 13 of the scanner device 11; in the example shown in FIG. 1, said field substantially corresponds to the lateral extension of the powder bed or powder layers 3. The focusing device 10 focuses the laser beam in the processing field 13, which is approximately planar and corresponds to an XY plane of an XYZ coordinate system in which the uppermost powder layer 3 or the top of the powder bed is located.

As can also be seen in FIG. 1, the powder layers 3 are applied onto a support 14 in the form of a base plate that can be displaced in the Z-direction. The support 14 is arranged in a processing chamber 15, which has a window 16 through which the laser beam 6 is radiated into the processing chamber 15. Since the processing field 13 of the scanner device 11 in which the powder material is fused remains at a constant distance from the scanner device 11 during production of the three-dimensional component 2, the support 14 is lowered by the thickness of a powder layer 3 in order to deposit a new powder layer 3.

New powder material is taken from a powder reservoir 18, which is also arranged in the processing chamber 15, by a device 17 for depositing (new) powder layers 3. In the example shown in FIG. 1, the device 17 for depositing new powder layers 3 is configured in the form of a displaceable arm, to the underside of which a slider 17a is attached so as to bring powder material from the powder reservoir 18 into the region of the powder layers 3 or to the top of the powder bed located above the support 14 in the build cylinder surrounding said support.

In the example shown in FIG. 1, a retroreflector 19 in the form of a three-dimensional object, more specifically a transparent ball made of quartz glass, is attached to a slightly tilted surface on the top of the device 17 (powder slider) configured as the displaceable arm for depositing the powder layers 3, said arm extending in the Y-direction, e.g., perpendicularly to the plane of the drawing, in the example shown. The retroreflector 19 can also be fastened to a different position on the arm. In the example shown, the retroreflector 19 in the form of the ball has a diameter of approximately 4 mm and reflects laser radiation 20 that represents a proportion of, for example, more than 5% of the intensity of the laser beam 6 back into the scanner device 11, and specifically substantially independently of the angle of incidence at which the laser beam 6 impinges on the retroreflector 19. The diameter of the retroreflector 19 in the form of the ball can also be smaller than 1 mm, for example, approximately 100 µm or less. For handling reasons, however, it may be advantageous for the retroreflector 19 to have a diameter of approximately 1 mm or more. In the example shown in FIG. 1, the laser beam 6 impinges on the retroreflector 19 substantially perpendicularly to the XY plane in which each powder layer 3 also extends; however, it goes without saying that a significant radiation proportion of the laser beam 6 of typically more than approximately 5% is reflected back to the scanner device 11 on the retroreflector 19 even when the direction of incidence of the laser beam 6 deviates from the perpendicular incidence.

The reflected laser radiation 20 passes through the scanner device 11 and the focusing device 10 in the opposite direction from the laser beam 6 and impinges on the deflection mirror 9. At the deflection mirror 9, a small proportion of the reflected laser radiation 20 is transmitted and is imaged or focused on a detector 22 in the form of a photodiode by an imaging device 21, which is configured as a lens in the example shown in FIG. 1. The detector 22 or photodiode is arranged coaxially with the beam path of the laser beam 6 and substantially detects laser radiation 20 that emanates from an actual position $X_P, Y_P$ of the laser beam 6 in the processing field 13 at which the retroreflector 19 is arranged in the example shown in FIG. 1, and is reflected back to the scanner device 11.

Due to imaging errors, for example, the actual position $X_P, Y_P$ of the laser beam 6 can deviate from a target position $X_T, Y_T$ specified for the scanner device 11 by a controller 23, and this may lead to deviations when projecting a pattern that corresponds to the two-dimensional geometry of a plane of the three-dimensional component onto the processing field 13. To transmit a pattern of this kind into the processing field 13 as precisely as possible, the scanner device 13 may be calibrated, during which, the target position $X_T, Y_T$ specified for the scanner device 11 is corrected such that it corresponds to the actual position $X_P, Y_P$ in the processing field 13. For this purpose, the projection errors of the scanner device, e.g., the deviation between the target position $X_T, Y_T$ and the actual position $X_P, Y_P$, may be identified as precisely as possible.

To do so, the exemplary process described below can be followed: the retroreflector 19 is arranged at a specified reflector position in or above the processing field 13, and a target position $X_T, Y_T$ that notionally corresponds to the specified reflector position in the processing field 13 is specified for the scanner device 11. The scanner device 11 scans a region of the processing field 13 around the notional reflector position, during which the laser radiation 20 reflected back in each case is detected, e.g., the laser beam 6 passes over the retroreflector 19 multiple times in a scanning movement. The actual position $X_P, Y_P$ of the laser beam 6 is determined in an evaluation device in the form of a measurement computer 24 (e.g., a first computing unit coupled with non-transitory computer-readable medium encoding instructions that cause the first computing unit to determine the actual laser beam position $X_P, Y_P$) on the basis of the intensity distribution I(X, Y) of the detected laser radiation 20. The actual position $X_P, Y_P$ can be determined, for example, in the manner described below:

First, the evaluation device 24 records the two-dimensional intensity distribution I(X, Y) (e.g., bitmap image) of the laser radiation 20 detected as the retroreflector 19 is passed over multiple times. By way of example, FIG. 1 shows the one-dimensional intensity distribution I(X) that is recorded as the retroreflector 19 is scanned and which extends through the center of the two-dimensional intensity distribution I(X, Y). Using image analysis, an intensity centroid of the intensity distribution I(X, Y) is identified; in the example shown in FIG. 1, in which the laser beam 6 has a rotationally symmetrical intensity distribution I(X, Y), said centroid corresponds to the intensity maximum in the X-direction and in the Y-direction. The centroid of the intensity distribution I(X, Y) of the detected laser radiation 20 forms the retroreflector position, e.g., the actual position $X_P, Y_P$ of the laser beam 6 that should actually coincide with the target position $X_T, Y_T$ originally specified for the scanner device 11 by the controller 23 (e.g. the first or a further computing unit coupled with non-transitory computer-readable medium encoding instructions that cause the first or the further computing unit to specify the laser beam target positions $X_T$, $Y_T$, and to correct the specified target positions $X_T$, $Y_T$, based on the determined actual positions $X_P$, $Y_P$.).

In the case described above, there is a deviation between the actual position $X_P$, $Y_P$ of the laser beam 6, or the reflector position, and the target position $X_T$, $Y_T$ originally specified for the scanner device 11 by the controller 23. This deviation is corrected, for example, by determining the difference between the target position $X_T$, $Y_T$ and the actual position $X_P$, $Y_P$ and adjusting the target position $X_T$, $Y_T$ accordingly in the controller 23 such that the actual position $X_P$, $Y_P$ and the target position $X_T$, $Y_T$ coincide. For this purpose, the evaluation device 24 sends the determined actual position $X_P$, $Y_P$ to the controller 23.

In the example shown in FIG. 1, multiple retroreflectors 19 in the form of three-dimensional objects, e.g., in the form of transparent balls, are arranged along the device 17 for depositing the powder layers 3 in order to calibrate the scanner device 11 at multiple actual positions $X_P$, $Y_P$ of the processing field 13. In particular, multiple retroreflectors 19 can be arranged next to one another in the Y-direction so as to calibrate the scanner device 11 for multiple actual positions $X_P$, $Y_P$ of the laser beam 6 in the Y-direction. This may be particularly advantageous since, in the example shown in FIG. 1, the movement axis of the device 17 for transporting powder material from the powder reservoir 18 to the region of the powder layers 3 extends in the X-direction, and so the device 17 may not be able to move in the Y-direction. However, to calibrate the scanner device 11 at different actual positions $X_P$, $Y_P$ of the laser beam 6 in the processing field 13 in the X-direction, it may be sufficient to displace the device 17 in the X-direction.

Figure 2:
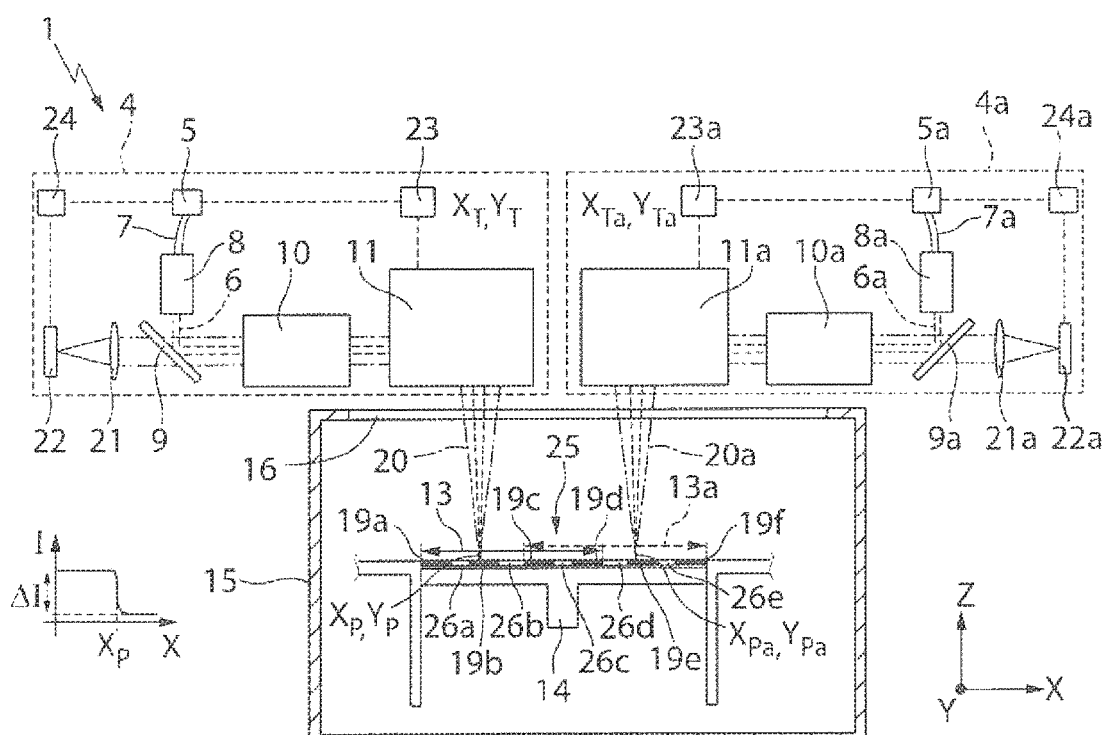
FIG. 2 is a schematic view of an exemplary machining device for producing three-dimensional components, in which the machining device includes retroreflectors for calibrating two scanner devices.

FIG. 2 shows a machining device 1 that differs from the machining device 1 shown in FIG. 1 in that it has an additional irradiation device 4a, which is constructed identically to the irradiation device 4 shown in FIG. 1. For example, the additional irradiation device 4a comprises an additional scanner device 11a for positioning an additional laser beam 6a in an additional processing field 13a, which partly overlaps the processing field 13 of the scanner device 11. The two irradiation devices 4, 4a are used to produce the same three-dimensional component, which is generated, similarly to FIG. 1, by locally fusing powder layers (not shown in FIG. 2) that are applied onto a support 14 surrounded by a build cylinder.

In the example shown in FIG. 2, a calibration element in the form of a calibration plate 25 is arranged in the processing chamber 15, said plate being introduced into the respective processing fields 13, 13a of the two scanner devices 11, 11a by a device 17 (not shown in FIG. 2) for depositing powder layers 3. In the example shown, the calibration plate 25 has been placed directly on the support 14.

In the example shown in FIG. 2, the calibration plate 25 has multiple retroreflectors 19a-f in the form of retroreflective surface regions, between which multiple non-retroreflective surface regions 26a-e are arranged. The non-retroreflective surface regions 26a-e can include, e.g., surface regions that absorb the laser beam 6. In the example shown in FIG. 2, the retroreflectors 19a-e in the form of the retroreflective surface regions are formed on a retroreflector foil in which microbeads are embedded so as to produce the retroreflective properties. Unlike as shown in FIG. 2, the absorbent surface regions 26a-e may be applied to the retroreflector foil in the form of a precision mask, e.g., the retroreflector foil may be covered by absorbent surfaces in the corresponding surface regions 26a-e. The retroreflector foil is applied to a substrate (not shown in FIG. 2). Alternatively or additionally to some of surface regions 26a-e being absorbent, some of surface regions 26a-e of the calibration plate 25 can be scattering or reflective (but not retroreflective) surface regions.

The scanner devices 13, 13a are calibrated by the calibration plate 25 similar to the method described in relation to FIG. 1. The calibration differs on account of the determination of the actual position $X_P$, $Y_P$ of the laser beam 6 in the processing field 13. In the calibration plate 25, the positions of the absorbent surface regions 26a-e are precisely known since they have been measured beforehand by means of a suitable measurement method.

To calibrate the scanner device 11, the laser beam 6 is moved in the processing field 13 along a movement path in which at least one border between a retroreflective surface region 19a-e and an adjacent absorbent surface region 26a-e is passed over. By way of example, the intensity I measured by the detector 22, which can be in the form of the photodiode, as the laser beam 6 moves in the X-direction exhibits a jump or a significant intensity difference $\Delta I$ at the transition between the retroreflective surface region 19b and the adjacent absorbent surface region 26b. This difference $\Delta I$ in the intensity I of the detected laser radiation 20 is recognized by the evaluation device 24 and assigned to an actual position $X_P$, $Y_P$ of the laser beam 6 in the processing field 13 The calibration can be carried out for multiple positions in the processing field 13 that are formed at the border between a retroreflective surface region 19a-f and an absorbent surface region 26a-e if a target path at which the laser beam 6 passes over a plurality of such borders has been specified for the scanner device 11.

The additional scanner device 13a is calibrated in a similar manner, e.g., the additional laser radiation 20a that is reflected back into the additional scanner device 13a by the calibration plate 25 and reaches an additional detector 22a through an additional focusing device 10a, an additional deflection mirror 9a and an additional imaging device 21a is evaluated by an additional evaluation device in the form of a measurement computer 24a (e.g., the first computing unit or an additional computing unit coupled with non-transitory computer-readable medium encoding instructions that cause the computing unit to determine actual laser beam position values $X_{Pa}$, $Y_{Pa}$). The evaluation result is provided to an additional controller 23a (e.g. the first computing unit or an additional computing unit coupled with non-transitory computer-readable medium encoding instructions that cause the first or the additional computing unit to specify the laser beam target positions $X_{Ta}$, $Y_{Ta}$, and to correct the specified target positions $X_{Ta}$, $Y_{Ta}$, based on the determined actual positions $X_{Pa}$, $Y_{Pa}$) in order to adapt the target values $X_{Ta}$, $Y_{Ta}$ to the actual values $X_{Pa}$, $Y_{Pa}$ determined by the additional evaluation device 24a. By using retroreflectors 19a-e at which a significant proportion of the intensity I of the laser beam 6 is reflected back into the scanner device 11 and a significant proportion of the intensity I of the additional laser beam 6a is reflected back into the additional scanner device 11a, the two scanner devices 11, 11a can be calibrated simultaneously without significant measurement errors, e.g., the actual position $X_P$, $Y_P$ of the laser beam 6 and the actual position $X_{Pa}$, $Y_{Pa}$ of the laser beam 6a can be determined concurrently.

What is claimed is:

1. A method for calibrating a laser scanner for positioning a laser beam in a processing field, the method comprising:

arranging a retroreflector in or above the processing field of the laser scanner and also between a processing sample in the processing field and the laser scanner, wherein the processing field is formed in a powder layer processing chamber;

detecting laser radiation that is reflected back into the laser scanner from the retroreflector as the laser beam passes over the retroreflector;

determining an actual position of the laser beam in the processing field based on the detected laser radiation;

calibrating the laser scanner by correcting a target position of the laser beam specified for the laser scanner in the processing field based on the determined actual position of the laser beam in the processing field;

directing an additional laser beam at an additional processing field formed in the powder layer processing chamber;

detecting additional laser radiation that is reflected back into an additional laser scanner as the additional laser beam passes over the retroreflector;

determining an actual position of the additional laser beam in the additional processing field based on the additional laser radiation detected; and calibrating the additional laser scanner by correcting a target position specified for the additional laser scanner based on the actual position of the additional laser beam in the additional processing field.

2. The method of claim 1, wherein the retroreflector is arranged directly above the processing field of the laser scanner in an automated manner.

3. The method of claim 2, wherein the retroreflector is attached to a movable arm that is configured to deposit powder layers in the processing field of the laser scanner.

4. The method of claim 1, wherein the retroreflector is a ball transparent to a wavelength of the laser beam, and determining the actual position of the laser beam in the processing field is based on an intensity distribution of the detected laser radiation.

5. The method of claim 1, wherein the retroreflector is in the form of a retroreflective surface region of a foil.

6. The method of claim 5, wherein the foil comprises at least one non-retroreflective surface region that adjoins the retroreflective surface region.

7. The method of claim 6, wherein determining the actual position of the laser beam in the processing field is based on a difference in an intensity of the detected laser radiation between the retroreflective surface region and the non-retroreflective surface region.

8. The method of claim 1, wherein the laser beam comprises a pilot laser beam, wherein the pilot laser beam is provided at a lower power than a processing laser beam used to irradiate powder layers in the powder layer processing chamber.

9. The method of claim 1, wherein the actual position of the laser beam and the actual position of the additional laser beam are determined simultaneously.

10. The method of claim 1, wherein the laser radiation is detected upstream of a focusing device that is arranged upstream of the laser scanner, and wherein the additional laser radiation is detected upstream of an additional focusing device that is arranged upstream of the additional laser scanner.

11. A machining device for producing three-dimensional components by irradiating powder layers, the machining device comprising:

an irradiation device comprising a laser source and a laser scanner configured to direct a laser beam from the laser source toward a processing field;

a processing chamber in which the processing field is located wherein the processing chamber comprises a powder layer support surface on which the powder layers are applied and wherein the processing chamber comprises a retroreflector arranged in or above the processing field of the laser scanner and also between a processing sample in the processing field and the laser scanner;

a photodetector arranged to detect laser radiation reflected back into the laser scanner from the retroreflector as the laser beam passes over the retroreflector;

a computer coupled with non-transitory computer-readable medium encoding instructions that cause the computer to perform operations comprising
determining an actual position of the laser beam in the processing field based on the detected laser radiation,
specifying a target position of the laser beam in the processing field, and
correcting the specified target position based on the determined actual position;

an additional laser scanner configured to direct an additional laser beam in an additional processing field of the processing chamber; and an additional photodetector arranged to detect additional laser radiation reflected back into the additional laser scanner by the retroreflector as the additional laser beam passes over the retroreflector, wherein the operations further comprise
determining an actual position of the additional laser beam in the additional processing field based on the additional laser radiation detected,
specifying a target position of the additional laser beam in the additional processing field, and
correcting the specified target position based on the determined actual position of the additional laser beam.

12. The machining device of claim 11, further comprising: an arm configured to move the retroreflector into the processing field of the laser scanner.

13. The machining device of claim 12, wherein the arm also is configured to deposit powder layers in the processing chamber.

14. The machining device of claim 11, wherein the retroreflector is a transparent ball or is a retroreflective surface region of a foil.

15. The machining device of claim 11, wherein the photodetector is a diode.

16. The device of claim 11, comprising:
a focusing device arranged upstream of the laser scanner; and
an additional focusing device arranged upstream of the additional laser scanner, wherein the photodetector is upstream of the focusing device, and wherein the additional photodetector is upstream of the additional focusing device.

17. The device of claim 11, wherein the laser beam is a pilot laser beam, and wherein both the laser source and the laser scanner are further configured to direct a processing laser beam from the laser source toward the processing filed to irradiate powder layers in the powder layer processing chamber, wherein the pilot laser beam is a lower power laser beam than the processing laser beam.

* * * * *